United States Patent [19]
Spofford

[11] Patent Number: 6,112,235
[45] Date of Patent: *Aug. 29, 2000

[54] METHOD AND APPARATUS FOR REMOTELY MANAGING A NETWORK HARDWARE DEVICE HAVING AN EMBEDDED SERVER WITH A CLIENT COMPUTER ACROSS A NETWORK

[76] Inventor: Jason J. Spofford, 11040 Crossland Dr., Austin, Tex. 78726

[*] Notice: This patent issued on a continued prosecution application filed under 37 CFR 1.53(d), and is subject to the twenty year patent term provisions of 35 U.S.C. 154(a)(2).

[21] Appl. No.: 08/863,408

[22] Filed: May 27, 1997

Related U.S. Application Data

[63] Continuation of application No. 08/478,822, Jun. 7, 1995, abandoned.

[51] Int. Cl.[7] .................................................. G06F 13/00
[52] U.S. Cl. .......................................... 709/223; 709/224
[58] Field of Search ..................... 395/200.47, 200.53, 395/200.49, 200.51, 762, 200.36, 200.33, 285; 709/223, 224, 217, 221, 203, 206; 710/105

[56] References Cited

U.S. PATENT DOCUMENTS

| | | | |
|---|---|---|---|
| 5,165,018 | 11/1992 | Simor | 395/200.1 |
| 5,299,304 | 3/1994 | Williams et al. | 395/148 |
| 5,421,009 | 5/1995 | Platt | 395/200.1 |
| 5,491,796 | 2/1996 | Wanderer et al. | 395/200.54 |
| 5,509,123 | 4/1996 | Dobbins et al. | 395/200.15 |
| 5,530,842 | 6/1996 | Abraham et al. | 395/500 |
| 5,530,852 | 6/1996 | Meske, Jr. et al. | 395/600 |
| 5,550,561 | 8/1996 | Ziarno | 345/163 |
| 5,572,643 | 11/1996 | Judson | 395/793 |
| 5,590,197 | 12/1996 | Chen et al. | 380/24 |
| 5,600,831 | 2/1997 | Levy et al. | 395/602 |
| 5,649,186 | 7/1997 | Ferguson | 395/610 |
| 5,696,901 | 12/1997 | Konrad | 395/200.33 |
| 5,742,762 | 4/1998 | Scholl et al. | 395/200.3 |

OTHER PUBLICATIONS

An information management system for engineering design based on hypertext by Brauer et al., Oct. 1991, IEEE publication, pp. 189–193.

Network management platform approach and its application KView II by Jeng et al., 1994 IEEE publication, pp. 417–424, 1994.

An investigation into integrating hypertext and messengers by Coleman, Jun. 1995, pp. 181–184.

Building a hypermedia information system on the internet by Lau, Feb. 1994, IEEE publication, pp. 192–197.

*Primary Examiner*—Zarni Maung
*Attorney, Agent, or Firm*—Akin, Gump, Strauss, Hauer & Feld, L.L.P.

[57] ABSTRACT

A method for remote management of a network hardware device using an industry standard internetwork protocol. A client and protocol stack are implemented on the computer network and an embedded server is installed on the network hardware device. Using the Hypertext Transfer Protocol (HTTP) and an available HTTP client, remote management of a hardware device is facilitated.

20 Claims, 2 Drawing Sheets

METHOD AND APPARATUS FOR REMOTELY MANAGING A NETWORK HARDWARE DEVICE HAVING AN EMBEDDED SERVER WITH A CLIENT COMPUTER ACROSS A NETWORK

This application is a continuation of application Ser. No. 08/478,822 filed on Jun. 7, 1995, now abandoned.

FIELD OF THE INVENTION

The invention relates to the remote management of hardware devices in a computer network.

BACKGROUND

In computer network environments, it is advantageous to manage the various hardware devices connected to the network from remote locations such as the system manager's office. Currently, remote management of network hardware devices is commonly accomplished using industry standard protocols such as the Simple Network Management Protocol ("SNMP"). While SNMP provides a reliable and well known mechanism for remotely controlling network hardware devices, it requires the use of specialized management consoles. These consoles are typically expensive and restricted to only those situations where the cost and training can be justified. then processes the URL and either returns the requested file or an error status which may include a default file name. The file is likely to contain links to other files which the user may select using the HTTP client. Some of the files that can be requested represent the status of the hardware device and as such are computed only upon request.

SUMMARY OF THE INVENTION

Lacking in the field of network management is an inexpensive method for controlling network hardware devices that utilizes a user-friendly graphical interface to facilitate management tasks. Borrowing on the World Wide Web concept, network device management is accomplished with the present invention by the use of an available Hypertext Transfer Protocol ("HTTP") client, or Web-browser, which uses HTTP to request a specific file using an Universal Resource Locator ("URL") to specify the file. The embedded HTTP server A user may also alter certain values in forms and request that the altered field be posted to the network hardware device for the purpose of effecting control over the operation of the network hardware device.

It is an object of the present invention to provide a novel method for remotely managing a network hardware device connected to a computer network.

It is a further object of the present invention to provide a method for remotely managing a network hardware device using an internetwork protocol.

It is a further object of this invention to provide an inexpensive method for remotely managing a network hardware device.

It is a further object of this invention to provide a novel method for managing network hardware by generating a computed file in response to an HTTP request.

It is a further object of this invention to provide for an embedded firmware HTTP server.

It is a further object of this invention to allow a response from the HTTP client so as to effect a change in the operational state of the network hardware device.

DETAILED DESCRIPTION

Figure 1:
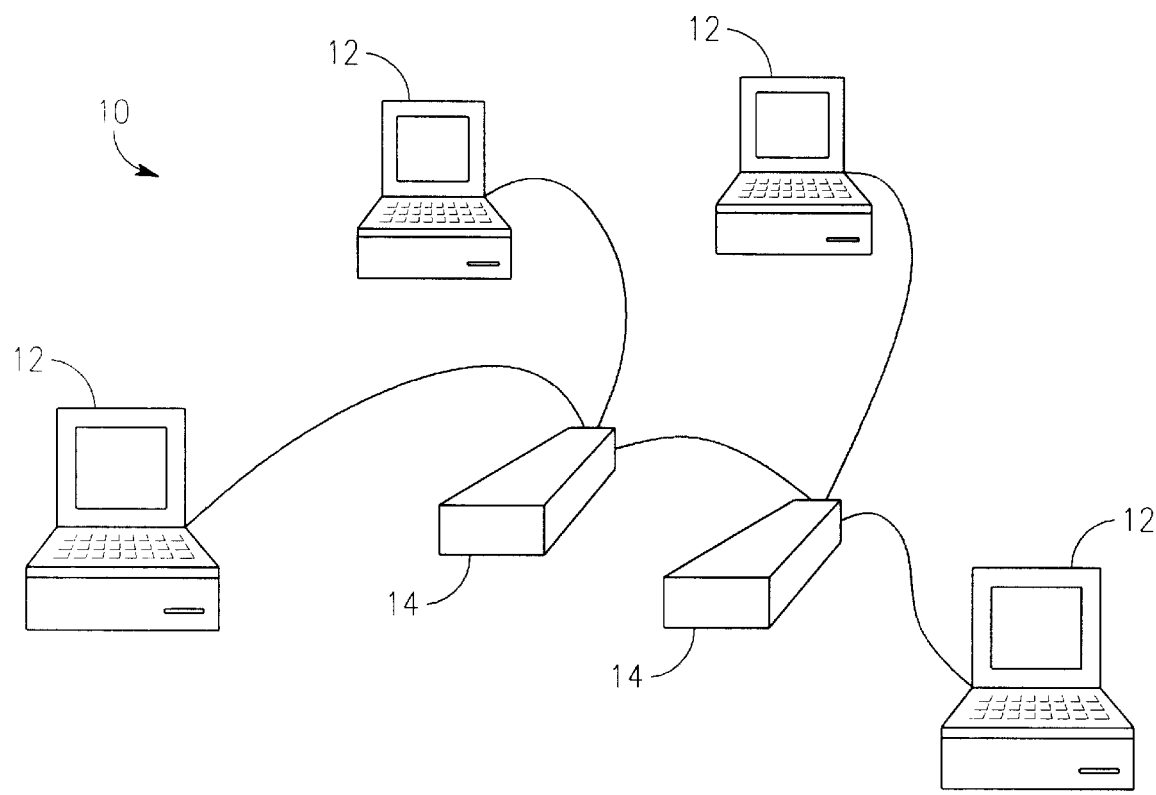
FIG. 1 depicts a computer network.

FIG. 1 depicts a computer network 10 comprising a plurality of computers 12 each connected to a plurality of network hardware devices 14 through the hardware device's ports, which are not shown in the drawing. In the preferred embodiment, each computer 12 is a personal computer running in a window-based environment. The network hardware device 14 is responsible for reliably directing information from one computer to another and is generally capable of enabling or disabling the various ports and of logging useful statistics, such as the volume of information received at each port. As an embedded device, device 14 generally contains no disk drive, no keyboard or other conventional input mechanism, and no display terminal.

In the preferred embodiment, the network hardware device is a repeater such that information received on one port is copied to all other ports. In an alternative embodiment, the network hardware device would be a switch such that information is only exchanged between addressed devices.

Figure 2:
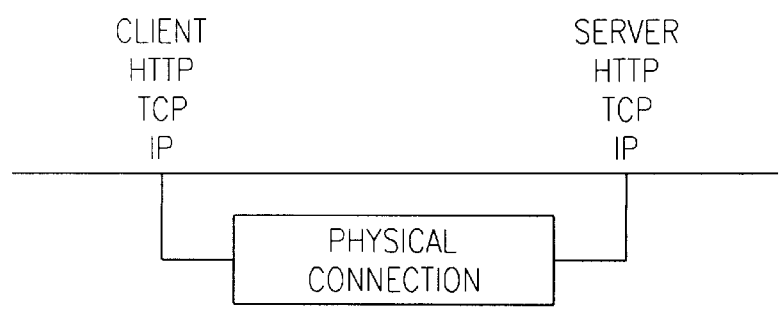
FIG. 2 depicts a client and server protocol stack.

Remote management of the network device 14 requires the implementation of a protocol stack on the computers 12 and on the hardware device 14. FIG. 2 is a symbolic representation of the protocol stacks of the computer 12 and the network hardware device 14. The stacks depict an application program at the of the protocol stack. The program at residing on the computer 12 is referred to as the client while the program on the device 14 is referred to as the server. In the preferred embodiment, the client application is implemented using a commercially available HTTP client such as MOSAIC or NETSCAPE. To implement the server application, firmware containing device specific Hypertext Markup Language ("HTML") files, or pages, is installed on the device. The home page will generally display the hardware device in graphical form and may contain pointers or links to additional HTML pages. These pages, invoked by selecting a link identifier, may contain information on the status of ports, usage statistics, or may allow control actions such as enabling or disabling of individual ports. Specifications for HTTP 1.0 and HTML+ are disclosed in Internet drafts <draft-fielding-http-spec-0.1.ps> and <draft-raggett-www-html-00.ps> respectively, available on the Internet at ds.internic.net. As shown in FIG. 2, the preferred embodiment implements the TCP/IP communications protocol. Implementation of this protocol on a computer network is well known in the art.

In network management applications, it is likely that some of the HTML pages for the hardware device will display information that changes over time, such as the status of a particular port. Executable code is necessary to compute the current values of these variable parameters, derived from hardware values, and format the values into the HTML page. Specifics of both the HTML files and the executable code will vary with the hardware device. The HTML files and the executable code are stored on a commercially available non-volatile memory element installed on the hardware device. Storage of firmware in non-volatile memory is well known in the art.

Figure 3:
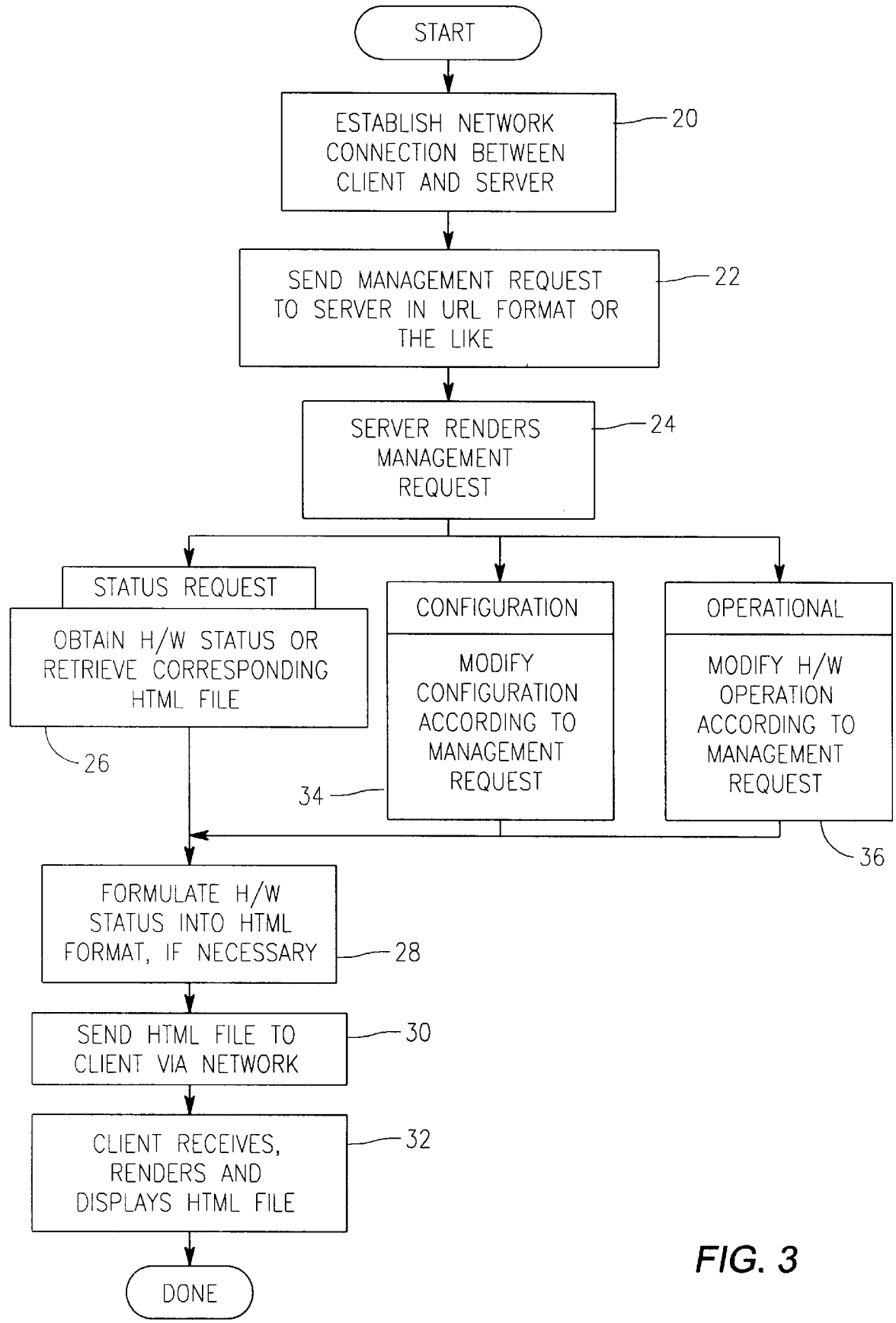
FIG. 3 depicts a flow diagram illustrating a method according to the present invention.

FIG. 3 depicts a flow diagram illustrating a method according to the present invention. At a first step 20, a network connection is established between a client and an embedded server of a hardware network device, such as shown by the physical connection in FIG. 2 or the links between the computers 12 and the hardware devices 14 in FIG. 1. At next step 22, the client sends a management request to the server in URL format or the like via the network. At next step 24, the server receives and renders the management request sent by the client. The management request may include a status request, a request to modify the configuration of the hardware network device or a request to modify the hardware operation of the hardware network device or any combination of these requests.

For a status request, the server obtains the hardware status of the hardware network device or retrieves an HTML file representative of the hardware status at next step 26. In the later case, the server maintains an HTML file representative of the hardware. At next step 28, the server formulates the hardware status into HTML format if necessary, unless the server already maintains an HTML file representative of the hardware. At next step 30, the server sends the HTML file to the client via the network and at next step 32, the client receives, renders and displays the HTML file. If the management request concerns configuration of the hardware network device, operation proceeds instead to step 34 from step 24, at which the server modifies the configuration of the hardware network device according to the management request. If the management request concerns hardware operation, operation proceeds instead to step 36 from step 24, at which the server modifies the hardware operation of the hardware device according to the management request. Operation may be completed after steps 34 or 36, or, optionally, operation may proceed from steps 34 or 36 to step 28, where the hardware status is formulated into an HTML file for sending to the client.

I claim:

1. A method for generating an HTML file response to remotely manage a network hardware device having an embedded HTTP server across a network with an HTTP client device, comprising the steps of:
    transmitting an HTTP request from an HTTP client to an HTTP server embedded within a network hardware device;
    said embedded server controlling the network hardware device and obtaining current hardware status of the network hardware device in response to the request and formulating the current hardware status in HTML file format;
    said embedded server returning said HTML file to said client; and
    said client receiving and rendering said HTML file according to HTTP.

2. The method of claim 1, further comprising a step of:
    said client device displaying the current hardware status in graphical form.

3. A method of remotely managing a network hardware device having an embedded HTTP server with an HTTP client device across a network, comprising the steps of:
    the client device establishing a connection with the embedded server via the network;
    the client device sending a management request in URL format to the embedded server via the network;
    the embedded server receiving and rendering the management request; and
    the embedded server controlling and modifying operational behavior of the network hardware device according to the management request.

4. The method of claim 3, wherein said step of establishing a connection is according to the TCP/IP protocol.

5. The method of claim 3, wherein the network hardware device has a particular configuration before receiving the management request, and wherein said step of modifying comprises a step of changing the configuration of the network hardware device.

6. The method of claim 3, wherein said step of modifying comprises a step of controlling the network hardware device.

7. The method of claim 6, wherein the network hardware device includes a plurality of ports, and wherein said step of controlling hardware of the network hardware device comprises a step of enabling or disabling at least one of the plurality of ports of the network hardware device.

8. The method of claim 3, further comprising the steps of:
    the client device sending an HTTP status request to the embedded server via the network for status information about the network hardware device;
    the embedded server receiving the status request and retrieving and formulating status information of the network hardware device into an HTML file; and
    the embedded server sending the HTML file according to HTTP to the client device via the network.

9. The method of claim 8, wherein said status information includes usage statistics.

10. The method of claim 8, wherein the network is the internet, and wherein the HTML file is a home page on the world wide web.

11. The method of claim 8, further comprising the step of:
    the client device receiving and rendering the HTML file and displaying the status information in graphical form.

12. The method of claim 11, wherein said step of sending a management request comprises the steps of:
    modifying a field of the status information; and
    the client device sending a management request to the embedded server via the network to change the status of the network hardware device.

13. A network management system for enabling a client computer system to remotely manage a network hardware device having an embedded server across an internetwork, comprising:
    an internetwork for enabling communication among remotely coupled computers and network devices;
    an HTTP client computer system coupled to said internetwork, comprising:
        a network interface for coupling to said internetwork;
        a display device;
        a client processor coupled to said network interface and said display device; and
        a client memory coupled to said client processor that stores HTTP code executable by said processor, the HTTP code instructing said client processor to send an HTTP operational status and control request in URL format via said internetwork, to receive and render an HTTP status response from said internetwork and to display status information from said status response on said display device; and
    a network hardware device coupled to said internetwork, comprising:
        at least one port coupled to said internetwork;
        a memory that stores executable code including an embedded HTTP server; and
        a processor coupled to said at least one port and said memory that executes said embedded server in said memory, said embedded server instructing said processor when executed to receive and render said HTTP operational status and control request from said client computer system, to control the network hardware device according to said HTTP operational status and control request, to format hardware status information of said network hardware device into an HTML file, and to send said HTML file as an HTTP status response to said client computer system via said internetwork.

14. The network management system of claim 13, wherein said client computer system further comprises:

said status information including control information;

an input device to enable modification of a field of said status and control information displayed on said display device;

said client memory including code to formulate an HTTP control request to reflect said modification of said status and control information, and to send said HTTP control request to said network hardware device via said internetwork; and said embedded server including code to instruct said processor to receive said HTTP control request and to change the operation of said network hardware device according to said HTTP control request.

15. The network management system of claim 14 wherein said network hardware device has a particular configuration before receiving said HTTP control request, and wherein said HTTP control request instructs said processor to change the configuration of said network hardware device.

16. The network management system of claim 14, wherein said HTTP control request instructs said processor to change an operational characteristic of said network hardware device.

17. The network management system of claim 14, wherein said HTTP control request instructs said processor to control hardware of said network hardware device.

18. The network management system of claim 17, wherein said network hardware device includes a plurality of ports, and wherein said HTTP control request instructs said processor to enable or disable at least one of said plurality of ports.

19. The network management system of claim 13, wherein said network hardware device comprises a repeater.

20. The network management system of claim 13, wherein said network hardware comprises a switch.

* * * * *